United States Patent [19]
van Es et al.

[11] Patent Number: 5,348,891
[45] Date of Patent: Sep. 20, 1994

[54] METHOD FOR AN INCREASED VISUALIZATION OF THE REACTION PRODUCT OF A SPECIFICALLY BINDING SUBSTANCE AND A CORRESPONDING BINDABLE SUBSTANCE AND TEST KIT THEREFOR

[75] Inventors: Remco M. van Es, Nr Koog Aan de Zaan; Gerrit D. Keizer, Zoeterwoude Rijndijk; Albert W. J. van Doorn, Arnhem, all of Netherlands

[73] Assignee: H.B.T. Holland Biotechnology, Leiden, Netherlands

[21] Appl. No.: 898,186

[22] Filed: Jun. 12, 1992

Related U.S. Application Data

[63] Continuation of Ser. No. 436,900, Nov. 15, 1989, abandoned.

[30] Foreign Application Priority Data

Nov. 15, 1988 [AU] Australia ............................ 25180/88

[51] Int. Cl.$^5$ .................. G01N 33/553; G01N 21/00; B01D 17/04; B01J 13/00
[52] U.S. Cl. ..................... 436/525; 436/524; 436/164; 436/805; 436/73; 252/340; 252/315.2; 252/302
[58] Field of Search ............... 436/501, 525, 524, 164, 436/805, 73; 252/302, 340, 315.2

[56] References Cited

U.S. PATENT DOCUMENTS 4,954,452  9/1990  Yost et al. ........................... 436/524
5,120,643  6/1992  Ching et al. ........................ 435/7.92

OTHER PUBLICATIONS

Weiser, H. B. *Inorganic Colloid Chemistry*, vol. 1 "The Colloidal Elements", 1933, pp. 305–360.

*Primary Examiner*—Margaret Parr
*Assistant Examiner*—Bradley L. Sisson
*Attorney, Agent, or Firm*—Cooper & Dunham

[57] ABSTRACT

The invention herein is directed to a method for the visualization of the product of the reaction of a specifically binding substance and a corresponding bindable substance. The reaction product is formed during an assay procedure for the detection and/or determination of one of the components of the reaction. The assay involves the use of a component labeled by a sol of a non-metallic element, such as selenium and tellurium, and the use of a physical developer comprising a metal compound, such as silver lactate and silver nitrate, mercuric chloride and a copper sulfate, to strengthen or reinforce a specific signal, thereby improving detectability.

14 Claims, No Drawings

METHOD FOR AN INCREASED VISUALIZATION OF THE REACTION PRODUCT OF A SPECIFICALLY BINDING SUBSTANCE AND A CORRESPONDING BINDABLE SUBSTANCE AND TEST KIT THEREFOR

This application is a continuation of application Ser. No. 436,900 filed Nov. 15, 1989, now abandoned.

BACKGROUND OF THE INVENTION

The invention relates to a method for the detection and/or determination in a test sample of a component of the reaction between a specifically binding substance and a corresponding bindable substance, using the mutual reactivity of such components and of at least one labelled component, and detecting the label, optionally after a separation of free and bound labelled component, in the test sample or in one of the fractions obtained after separation.

Such a process is known from many recent publications, such as European patent applications EP-A-0 007 654 (Akzo N.V., publ. Feb. 6, 1980) and EP-A-0 158 746 (Janssen Pharmaceutica N.V., publ. Oct. 23, 1985) which disclose the use of a labelled component comprising sol particles of a metal or metal compound, in particular gold and silver sol particles, as the label. In European patent application EP-A-0 032 270 (Akzo N.V., published Jul. 22, 1981) the utility as a label of sol particles of a hydrophobic dye or pigment is disclosed. The use as a label of sol particles of non-metallic elements, such as selenium ($Se), tellurium (Te) and sulfur (S) is disclosed in European patent application EP-A-0 298 368 (Abbott Laboratories, publ. Jan. 1, 1989) and in Dutch patent application NL-A-87.02769 and the corresponding part of EP-A-0 321 008 (in the name of H.B.T. Holland Biotechnology B.V., published Jun. 21, 1989).

It is suggested in the above mentioned EP-A-0 158 746 that the detection of colloidal metal particles bound at the surface of an immobilized matrix, e.g. the nitrocellulose strip used in a dipstick assay, can be improved by increasing their visibility as a result of a physical development. Said physical development is obtained by the application of a physical developer which comprises a silver-containing compound, such as silver lactate or silver nitrate, which can be reduced to metallic silver. The physical developer further comprises a reducing agent, a buffer and stabilizing agents (see Swinburne, Immunocytochemistry, 1987, 30–37). The reaction initially takes place at the surface of the metal particles which catalyze the reduction, and then, subsequently, becomes auto-catalytic on these seeds. A black, highly contrasting signal is formed due to the accumulation of metallic silver. A considerable increase in sensitivity results therefrom.

SUMMARY OF THE INVENTION

It has now surprisingly been found that such a physical development is not restricted to the use of silver for effecting an improved visualisation of colloidal metal particles, but can also be used for an improved visualisation of colloidal non-metal particles, such as sol particles of elemental selenium (Se) and elemental tellurium (Te) and can also be performed with metal-containing compounds other than silver compounds.

The utility of sol particles as a marker system for e.g. immunochemical reactions (for example in dipstick assays) generally requires a good visibility or, in more general terms, a good detectability of the sol particles. Some kinds of sol particles are not quite satisfactory in this respect because they are either not colored or only weakly colored. Examples of sol particles whose utility would be improved by an enhanced visibility are particles from elemental sulfur sols and those from elemental selenium sols. The present invention fulfills a need by providing a solution of this problem with uncolored or weakly colored sol particles of non-metallic elements. Also with sol particles having a strong color of themselves, however, an enhanced contrast and improved sensitivity may be obtained by application of the present invention.

The invention provides a method for the detection and/or determination in a test sample of a component of the reaction between a specifically binding substance (e.g. protein, DNA, RNA, polysaccharide) and a corresponding bindable substance, using the mutual reactivity of such components and of at least one labelled component, and detecting the label, optionally after a separation of free and bound labelled component, in the test sample or in one of the fractions obtained after separation, wherein said labelled component is labelled with sol particles of a non-metallic element and the detection of the label is carried out after a physical development of the signal using a metal-containing compound.

It should be understood that the words "sol particles of a non-metallic element" refer to particles derived from a dispersion thereof (preferably an aqueous dispersion, but alcoholic dispersions and dispersions in other organic liquids are not excluded), said particles substantially consisting of a non-metallic element without any intention, however, to exclude that the sol particles are not fully homogeneous and contain a minor amount of the non-metallic element in the form of a chemical compound, i.e. sol particles of selenium, for example, may contain some selenium oxide, but most of the selenium will be present in the elemental form. Preferably at least 60%, more preferably at least 70% and most preferably substantially all of the selenium will be present in the elemental form. The same applies to sol particles of other non-metallic elements, such as sulfur, tellurium, etc.

Of course, it is inherent to the words "sol particles of a non-metallic element" that the element concerned is an element which can exist in the form of a sol. Chemical elements such as hydrogen, helium, oxygen, etc. do not satisfy this inherent requirement and are consequently not covered by the word "element" as used herein. The invention is particularly concerned, however, with sol particles of, e.g., selenium, sulfur, tellurium, arsenic and phosphorus. Most preferably, the invention relates to a method in which selenium or tellurium sol particles are used as the label.

Although in principle any metal-containing compound, more particularly any metal salt may be used for physical development of the signal, it is preferred to use a silver salt, especially silver lactate or silver nitrate therefor. Examples of other metal-containing compounds which have been found particularly suitable for use in a physical developer are mercury salts, such as mercury chloride, and copper salts, such as copper sulphate.

The invention further provides a test kit for the detection and/or determination in a test sample of a component of the reaction between a specifically binding substance and a corresponding bindable substance, using the mutual reactivity of such components and of at least one labelled component, and detecting the label, optionally after a separation of free and bound labelled component, in the test sample or in one of the fractions obtained after separation, wherein the test kit comprises a labelled component which is labelled with sol particles of a non-metallic element, and in addition comprises a physical developer of the signal, which comprises a metal-containing compound.

DETAILED DESCRIPTION OF THE INVENTION

The invention will be explained in greater detail by means of the following examples of preferred embodiments thereof. It should be noted, however, that the examples are not intended to limit the scope of the invention but merely serve to illustrate the invention.

EXAMPLE 1

0.20 g selenium oxide ($SeO_2$, Baker Chemical Company) was dissolved at room temperature in 995 ml demineralized water. The solution was continuously stirred with a magnetic bar. After stirring for 3 min, a freshly prepared solution of 0.25 g $NaBH_4$ (Chemetal) in 5 ml demi water was quickly added under vigorous stirring. While releasing $H_2$, the original clear and colorless reaction mixture obtained a clear deep orange/red color after 3 min. After that time, no further increase of color was observed.

The selenium sol was purified and eventually concentrated by dialysis. The particles had a spherical shape and an average diameter of 35±4 nm. The sol was stable and remained clear for several days.

The colloidal selenium particles were then coated with anti-b-galactosidase IgG (from ascites). The selenium sol (50 ml) was adjusted to pH 7.5 by means of 0.01M $K_2CO_3$. Then 80 ml of anti-b-galactosidase IgG (from ascites) was added. Coupling took place at room temperature for 10 minutes. The mixture was then centrifuged at 4600 xg and 4° C. for 10 minutes. The supernatant above the loose pellet was removed by sucking and the pellet was suspended in 5 mM NaCl (1/20th part of the original volume). No additional stabilizing agents were added to the suspension. The anti-b-galactosidase IgG (ascites)-selenium probe thus obtained was used for detection purposes.

A concentration series of goat anti-mouse polyclonal IgG (1280 ng to 2.5 pg) was spotted onto nitrocellulose test strips[1]. The dried test strip was incubated with the coated selenium particles and after some minutes the lowest visible IgG spot determined. The lowest visible IgG spot was 80 pg.

Application of the physical development method according to the present invention, using the commercially available silver enhancement kit from Janssen Pharmaceutica, the lowest visible spot was 20 pg.

Note (1): the test strips were made of nitrocellulose paper having a pore diameter of 0.45 mm and being cut to a size of 1.2 cm×5.5 cm. The spots applied to the test strips had a volume of 1 ml. After spotting the concentration series, the strips were dried at 37° C. for 20 minutes. Immediately thereafter, the bare parts of the strips (i.e. the parts that were not covered) were blocked with a 3% Bovine Serum Albumine (BSA) solution in Phosphate Buffered Saline (PBS) at 37° C. After 20 minutes, the strips were dried at 37° C. and were then ready for use.

Note (2): the test strips were incubated in a 1:50 dilution of the probe in PBS+1% BSA for at most 2 hours. During the incubation, the strips and incubation mixture were agitated on a shaker in polypropylene tubes. The sensitivity of a probe was determined by the lowest visually detectable concentrations of spotted (immobilized) protein in non-optimized systems.

EXAMPLE 2

80 mg telluric acid ($H_6TeO_6$, Merck) was dissolved in 1 liter of demineralized water. After stirring for 5 minutes at room temperature, a freshly prepared solution of 0.20 g $NaBH_4$ (Chemetal) in 2 ml demineralized water was quickly added under vigorous stirring. After 1 minute, a clear purple/brown sol was formed which was stable in optical density after 3 minutes. The resulting stable tellurium sol was purified and eventually concentrated by dialysis.

The colloidal tellurium particles were then coated with protein A. The tellurium sol (50 ml) was adjusted to pH 6.1 by means of 0.01M $K_2CO_3$. Then 330 mg protein A was added. Coupling took place at room temperature for 10 minutes. The mixture was then centrifuged at 18000 xg and 4° C. for 10 minutes. The supernatant above the loose pellet was removed by sucking and the pellet was suspended in 5 mM NaCl (1/20th part of the original volume). No additional stabilizing agents were added to the suspension. The protein A-tellurium probe thus obtained was used for detection purposes.

A concentration series of rabbit IgG (1280 ng to 2.5 pg) was spotted onto nitrocellulose test strips. The dried test strip was incubated with the coated tellurium particles and after some minutes the lowest visible spot determined. The lowest visible spot was 1.5 ng.

Use of the commercially available silver enhancement kit from Janssen Pharmaceutica for physical development according to the present invention caused the lowest visible spot to be 600 pg.

EXAMPLE 3

Colloidal selenium particles were prepared and coated with the same mouse monoclonal antibody as described in Example 1. A concentration series of goat anti-mouse IgG was spotted onto nitrocellulose test strips. The dried test strip was incubated with the coated selenium particles and after some minutes the lowest visible spot appeared to be 120 ng.

Other equally treated strips were incubated in different physical developers based on mercuri chloride. The composition of the physical developers and the lowest visible spots (lvs) which resulted from their use are shown in table I.

TABLE I

| Composition of developer | lvs (ng) |
| --- | --- |
| 8 ml $H_2O$, 1 ml 0.1 N $HgCl_2$, 1 ml 0.1 mol hydrochinon | 30–60 |
| 8 ml $H_2O$, 1 ml 0.1 N $HgCl_2$, 1 ml 0.1 mol vitamine C | 120 |
| 9 ml $H_2O$, —   , 1 ml 0.1 mol hydrochinon | 120 |
| 9 ml $H_2O$, —   , 1 ml 0.1 mol vitamine C | 120 |
| 10 ml $H_2O$, — | 120 |

We claim:

1. A method for determining presence or amount of an analyte in a sample, comprising contacting said sample with a binding component capable of specifically recognizing and binding said analyte, said binding component being labelled with colloidal particles of an element selected from the group consisting of selenium and tellurium and determining the presence or absence or the amount of the resulting labelled complexes comprising said analyte, said binding component and said colloidal particles as an indication of the presence or absence of said analyte in said sample and the amount of said resulting labelled complex serving as a measure of the amount of said analyte in said sample, said determination of said labelled complexes consisting of said analyte and said binding component be carried out by physical development of said labelled complex by contacting said labelled complex with a metal compound and a reducing agent capable of liberating the metal from said metal compound in the presence of said colloidal particles for deposition of said metal onto said colloidal particles making up said labelled complex.

2. A method according to claim 1, wherein colloidal particles of the element selenium (Se) are used as the label.

3. A method according to claim 1, wherein colloidal particles of the element tellurium (Te) are used as the label.

4. A method in accordance with claim 1 wherein said metal compound used for physical development is a silver compound.

5. A method in accordance with claim 4 wherein said silver compound is selected from the group consisting of silver lactate and silver nitrate.

6. A method in accordance with claim 1 wherein said metal compound is a mercury salt.

7. A method in accordance with claim 6 wherein said mercury salt is mercury chloride.

8. A test kit for determining the presence of or the amount of analyte in a test sample comprising a binding component capable of specifically recognizing said analyte, a labelling component comprising colloidal particles of elemental selenium or elemental tellurium for labelling said binding component and a physical developer for resulting formed complex comprising said analyte, said binding component and said colloidal particles, said physical developer comprising a metal compound and a reducing agent capable of liberating metal from said metal compound in the presence of said colloidal particles.

9. A test kit in accordance with claim 8 wherein said colloidal particles are colloidal particles of selenium.

10. A test kit in accordance with claim 8 wherein said colloidal particles are colloidal particles of tellurium.

11. A test kit in accordance with claim 8 wherein said metal compound is a silver salt.

12. A test kit in accordance with claim 11 wherein said silver salt is selected from the group consisting of silver lactate and silver nitrate.

13. A test kit in accordance with claim 8 wherein said metal compound is a memory salt.

14. A test kit in accordance with claim 13 wherein said metal salt is mercury chloride.

* * * * *